United States Patent [19]

Kent

[11] Patent Number: 4,694,289

[45] Date of Patent: Sep. 15, 1987

[54] DISPLAY MEMBER

[75] Inventor: Roger S. Kent, Duncraig, Australia

[73] Assignee: E.R.G. Management Services Pty., Ltd., Subiaco, Australia

[21] Appl. No.: 634,156

[22] PCT Filed: Dec. 2, 1983

[86] PCT No.: PCT/AU83/00177
§ 371 Date: Jul. 24, 1984
§ 102(e) Date: Jul. 24, 1984

[87] PCT Pub. No.: WO84/02414
PCT Pub. Date: Jun. 21, 1984

[30] Foreign Application Priority Data

Dec. 8, 1982 [AU] Australia .................................. PF7176
May 24, 1983 [AU] Australia .................................. PF9513

[51] Int. Cl.$^4$ .............................................. G09G 3/34
[52] U.S. Cl. ................. 340/815.05; 340/763; 340/783
[58] Field of Search ............... 340/783, 788, 763, 764, 340/815.05, 815.23, 815.29

[56] References Cited

U.S. PATENT DOCUMENTS

| | | | |
|---|---|---|---|
| 1,049,240 | 12/1912 | Janacek | 340/764 |
| 3,698,793 | 10/1972 | Tellerman | 340/783 |
| 3,812,490 | 5/1974 | Goodrich | 340/788 |
| 3,825,927 | 7/1974 | Passien | 340/764 |
| 4,062,009 | 12/1977 | Raverdy et al. | 340/787 |

Primary Examiner—Marshall M. Curtis
Attorney, Agent, or Firm—Harness, Dickey & Pierce

[57] ABSTRACT

A display member (10) comprising a housing (14) having a chamber (12) with a viewing face (16) and a lamina member (24) movably mounted within said chamber (12) to be movable into a first position in which one face (26) of the member (22) in face to face contact with said viewing face (16) and a second position in which the one face (26) of the member (24) is out of contact with the viewing face (16) and the other face (25) is in face to face with a rear face (15) of the chamber (12) spaced rearwardly from the viewing face (16), drive means (22, 20) being provided to produce an attractive and/or repulsive force between said housing (14) and said member (24) to move said member (24) from said first or second position to the other position wherein no external drive means need be provided to maintain said member (24) in said first or second position, an opaque fluid filling said chamber.

42 Claims, 11 Drawing Figures

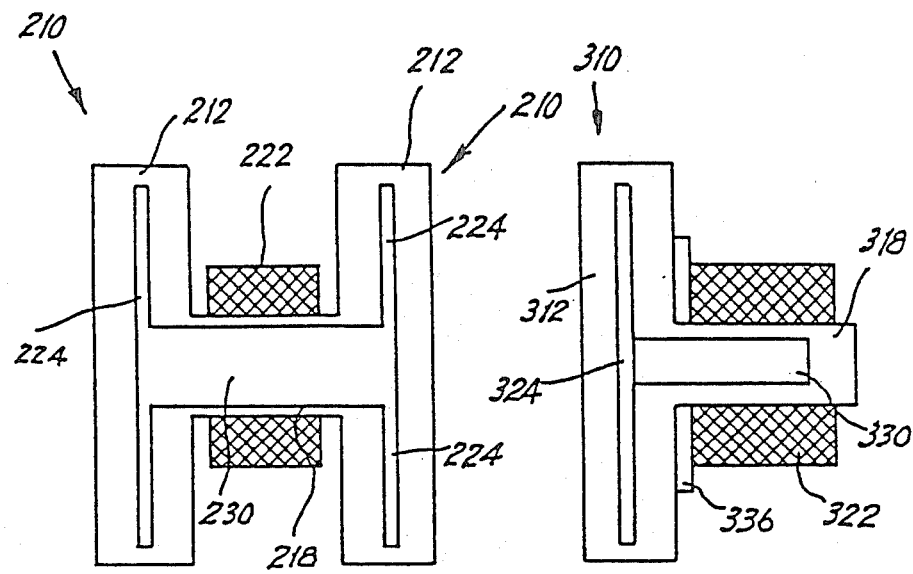
_Fig 4_  _Fig 5_
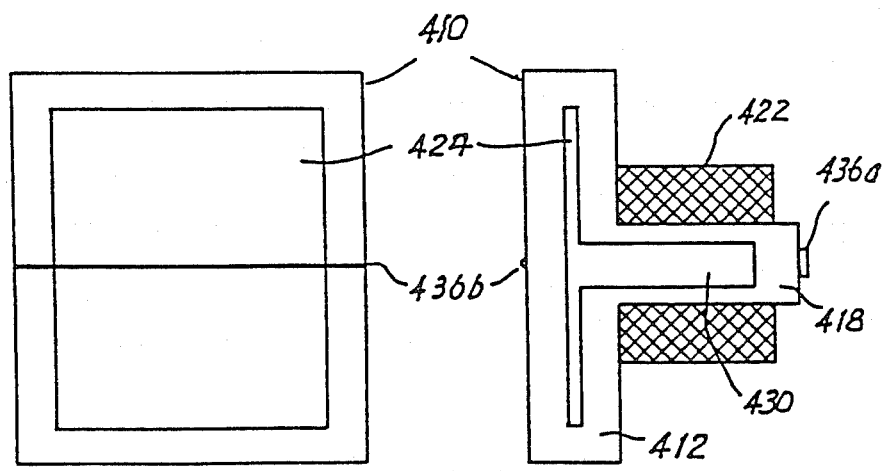
_Fig 6_  _Fig 7_

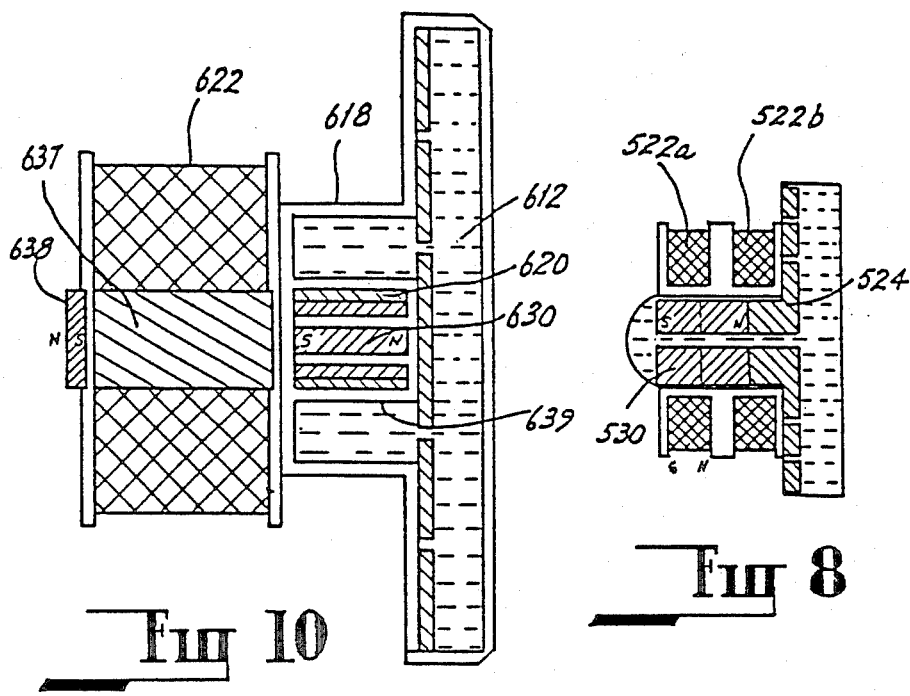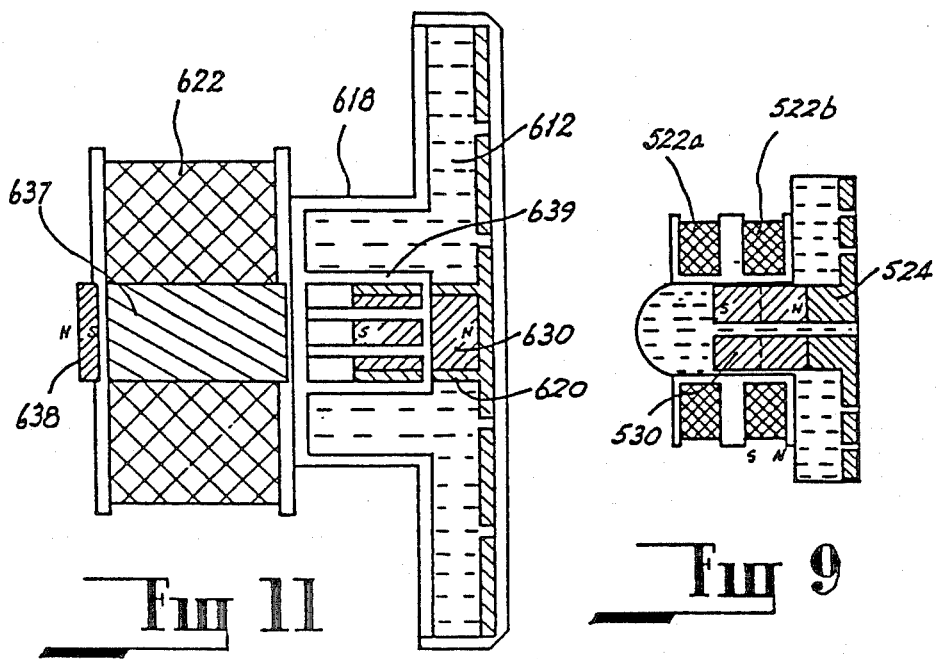

DISPLAY MEMBER

This invention relates to a bistable display element.

In one form the invention resides in a display member comprising a housing having a chamber with a viewing face and a lamina member movably mounted within said chamber to be movable into a first position in which one face of the member is in face to face contact with said viewing face and a second position in which the one face of the member is out of contact with the viewing and the other face is in face to face with a rear face of the chamber spaced rearwardly from the viewing face, drive means being provided to produce an attractive and/or repulsive force between said housing and said member to move said member from said first or second position to the other position wherein no external drive means need be provided to maintain said member in said first or second position, an opaque fluid filling said chamber.

According to a preferred feature of the invention, said drive means comprises a first magnetic device on said housing and a second magnetic device on said member wherein the polarity of at least one magnetic device is capable of being reversed.

According to a further preferred feature of the invention, the other face of the lamina member is formed with a post which supports said second magnetic device and which is receivable in a portion of the housing accommodating the first magnetic device.

According to a further preferred feature of the invention, wherein said first magnetic device comprises an electromagnetic coil.

According to a further preferred feature of the invention, said housing is supported on a mounting plate which supports said electro-magnetic coil.

According to a further preferred feature of the invention, said post is axially slidable in said portion but is incapable of relative rotation therein.

According to a further preferred feature of the invention, said member has a substantially zero buoyancy within fluid in said chamber.

According to a further preferred feature of the invention, said lamina member, the viewing face and the rear face are substantially planar.

According to a further preferred feature of the invention, said member is formed with apertures to permit communication between the faces of said member.

The invention will be more fully understood in the light of the following description of several specific embodiments. The description is made with reference to the accompanying drawings of which;

FIG. 4 is a section elevation of a display member according to the third embodiment;

FIG. 5 is a section elevation of a fourth embodiment; and

FIGS. 6 and 7 are a front elevation and section elevation respectively of a fifth embodiment.

Figure 1:
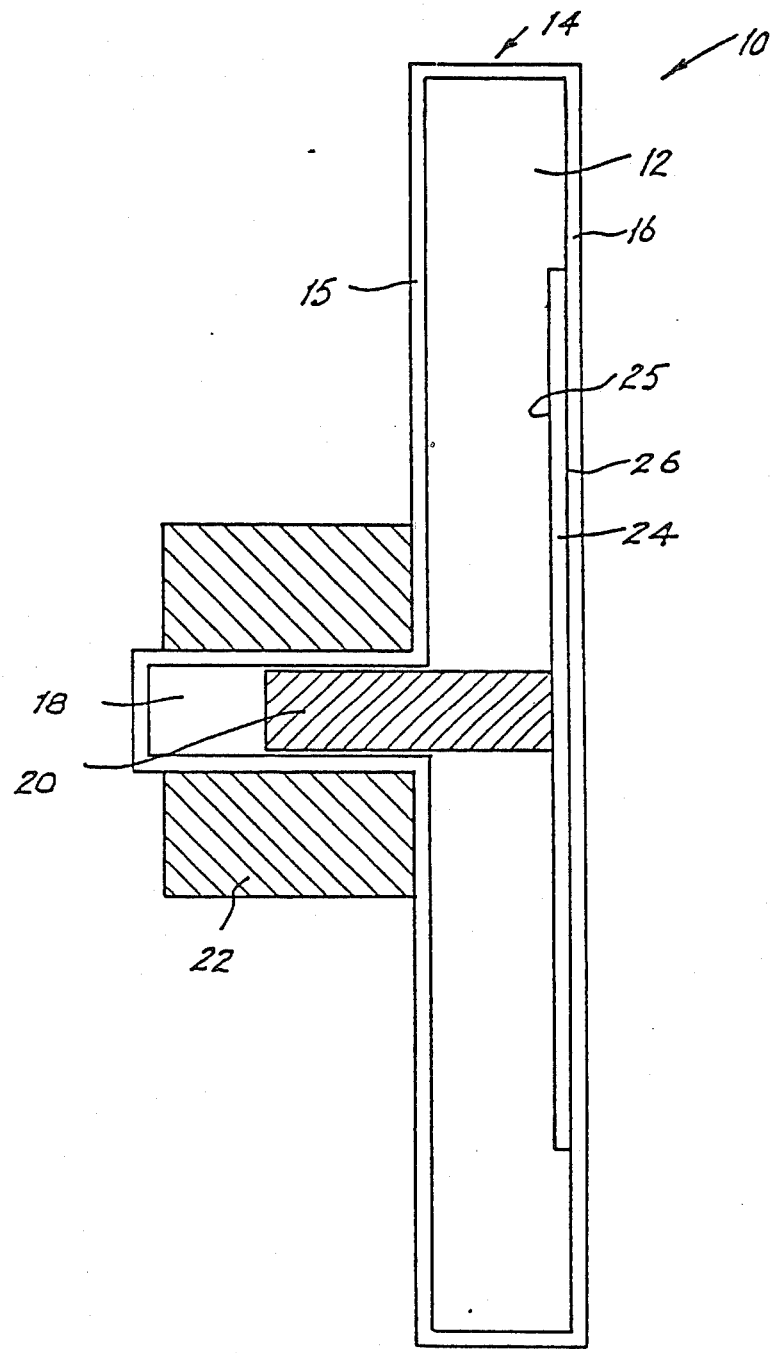
FIG. 1 is a schematic view of a display member according to the first embodiment.

The embodiment shown at FIG. 1 is directed towards a display unit 10 comprising a housing 14 which defines a substantially square prismatic chamber 12 having a transparent front viewing face 16, a rear face 15 and is formed with a centrally disposed axial sub-chamber 18 extending from the rear face 15. The chamber 12 contains a laminar shaped reference member 24 having a display face 26 adjacent the viewing face 16 and a rear face 25 adjacent the rear face 15 of the chamber 12. The reference member 24 is formed with a central axially located post 20 on its rear face which is axially slidable within the recess 18 whereby on movement of the reference member 24 between the viewing face 16 and the rear face 15 of the chamber 12, the post 20 moves into the recess 18. The spigot 20 accommodates a permanent magnet having its poles axially spaced along the post. The portion of the housing 14 defining the recess 18 supports an electro-magnetic coil which is connected to a D.C. electrical supply. The chamber 12 contains an opaque liquid whereby on movement of the reference member 24 to the rear face 15 of the chamber 12, the display face 26 can not be observed through the viewing face 16. Movement of the reference member 24 between the rear face 15 and the viewing face 16 is effected through the electro-magnetic coil 22 which is energised with the opposite polarity to the adjacent pole of the permanent magnet in the post 20 to cause the movement of the reference member 24. In order to retract the reference member 24, the polarity of the electromagnetic coil is reversed to move the reference member 24 into face to face engagement with the rear face 15 of the chamber 12. On movement of the reference member 24 into face to face engagement with the viewing face 16 or rear face 15 of the chamber 12, the resultant attractive forces between the two faces as a result of surface tension and/or adhesion together with the frictional forces between the reference member, its post and the housing serve in positively retaining the reference member 24 in either end position. As a result, it is not necessary to maintain the electro-magnetic coil activated in order to retain the reference member 24 in either of its end positions.

As a result of the embodiment, a display member is produced which is bistable and requires power only to change its state of display. The display member may take the form of a single display wherein the reference member 24 carries a desired display or message or may form one module of an array of display modules whereon activation of some of the modules provides a pattern which may he meaningful such as a form of display used in sporting stadiums to show sporting results and/or the graphic display of a scene or event.

If desired, opaque liquid may be replaced by a gas and/or may be replaced by an opaque or coloured fluid having the capacity to fluoresce.

Figure 3:
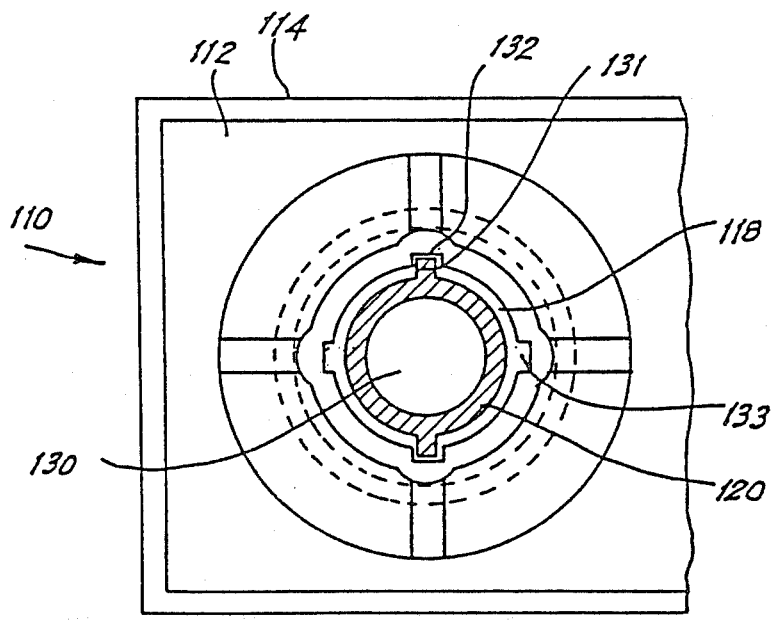
FIG. 3 is a cross-sectional elevation along line 3—3 of FIG. 2.

The second embodiment of the invention is directed towards a display member 110 comprising a housing 114 which can be fitted into engagement with a mounting plate 113 in close abutting relationship with a number of other similar housings to define a display surface. The housing 114 defines a substantially rectangular prismatic chamber 112 having a front transparent viewing face 116 and a rear face 115. The chamber 122 is formed with a plurality of equally spaced axially directed recesses 118 (only one of which is shown). Each recess 118 is received within an electro-magnetic coil 122 mounted to the support plate 113. The chamber 112 has located therein a reference member 124 having a display face 126 adjacent the transparent viewing face 116 of the chamber 112 and a rear face 125 adjacent the rear face 115 of the chamber 112. Apertures 127 are formed through the reference member 124 to provide for communication between the faces 126 and 125. The rear face 125 of the reference member 124 supports a tube-like post 120, the outer end of which is closeable by a plug 128 formed with a flexible diaphragmatic wall 129. The interior of the post 120 supports a permanent magnet 130 which only partially fills the space within the post 120 wherein the remainder of the space contains air. As shown at FIG. 3, the outer walls of the post 120 are formed with a pair of diametrically opposed axial splines 131 which are receivable within correspondingly shaped grooves in the walls of the recess 118 of the chamber 112. The function of the mating engagement between the splines 131 and the grooves 132 is to permit slidable axial movement of the post 120 within the recess 118 but to prevent rotary movement of the post 120 within the recess 118. A further pair of grooves 133 in the walls of the recess 118 permit fluid flow between the space defined by the rear end of the post 120 and the recess 118 and the main portion of the chamber 112. The chamber 112 and the recess 118 are filled with an opaque liquid and the chamber is sealed off through a rearward extension 134 of the recess 118. As a result of the air contained within the post 120 of the reference member 124, the reference member has substantially zero buoyancy within the chamber 112 to minimise frictional engagement between the reference member 124 and the walls of the chamber 112. In addition, any thermal expansion or contraction of the liquid contained within the chamber 112 is accommodated by the flexing of the flexible diaphragmatic wall 129 of the plug 128 in the post 120 of the reference member.

Figure 2:
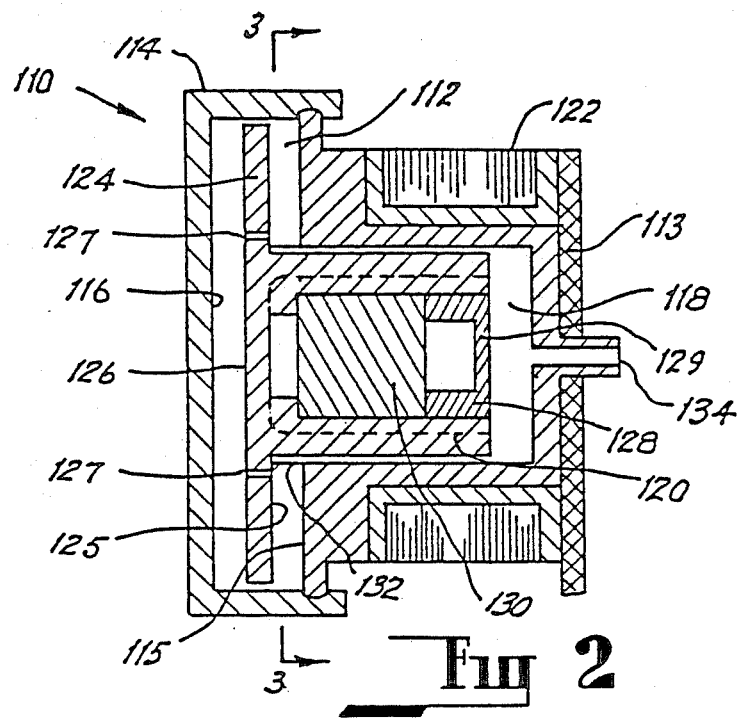
FIG. 2 is a sectional elevation of a display member according to the second embodiment.

The embodiment of FIGS. 2 and 3 comprises a plurality of reference members 124 mounted in side by side relationship along the length of the housing 114. If desired, the display member may comprise only one display module. Alternatively each reference member may be accommodated within a sub-chamber of the chamber 112 in which there may or may not be communication between the sub-chambers.

As with the previous embodiment, if desired, an alternative to the opaque liquid within the chamber 112 may comprise a gas or a liquid having a property such as fluorescence.

If desired, the reference member may be moved within the chamber 124 by means of electrostatic forces rather than the magnetic forces discussed in relation to each of the above embodiments whereby the reference member and a portion of the housing 114 is charged appropriately in order to effect the desired repulsive or attractive forces to move the reference member to one of its end positions.

If desired, the display member may be formed such that a pair of displays are located back to back with their reference members in opposed relation to each other to produce a two faced display operable through separate or common electro-magnetic coils. The third embodiment shown at FIG. 4 is an example of such an arrangement. The third embodiment comprises a pair of display members 210 each having a pair of chambers 212 supporting a reference member 224. The chambers 212 are interconnected by an axially directed tube like recess 218 which slidably accommodates a permanent magnet 230 in the form of a post or its support housing which interconnects the reference members 224 in each chamber. A coil 222 surrounds the recess 218 and its operation effects the translation of the reference members 224 in their respective chambers 212. If desired the reference member in each display member may be independent of the other.

To facilitate the retention of the reference member at one of its end positions a soft iron element may be mounted to the display member in association with the permanent magnet. The fourth embodiment as shown at FIG. 5 is an example of such an arrangement. As shown at FIG. 5, a soft iron element 336 is mounted to the rear face of the chamber 312. When the reference member 324 is at either of its end positions, the soft iron element is adjacent one or the other poles of the permanent magnet post 330. The attractive forces between the soft iron element 336 and the adjacent pole of the permanent magnet post 330 wil ensure the stability of the display element in both of its states.

The fifth embodiment of FIGS. 6 and 7 is a further example of the previous feature. In the fifth embodiment the soft iron element or magnet 436a comprises one element fixed to the outer end of the axial recess 418 and another soft iron element or magnet in the form of a thin strip 436b or button fixed to the front face of the chamber 412.

A further embodiment is shown at FIGS. 8 and 9 and varies in relation to the electro-magnet which comprises a pair of electro-magnets 522a and 522b spaced axially along the recess 518. The electro-magnet are spaced apart a distance corresponding to the degree of movement of the reference within the chamber. In addition the electromagnets are located such that when the reference member is in either of its end positions one pole of the magnet of the reference member is located partially within one of the electro-magnets. As a result when the electro-magnet having the end of the permanent magnet partially within it, is activated, the force applied to the reference member is maximised.

The embodiment of FIGS. 10 and 11 relates to a display member where the electro-magnet 622 is located to the rear of the recess 618 and has a central soft iron core and coil former 637 one end of which abuts against the rear end of the recess 618. The activation of the electromagnet induces a magnetic field in the core 637 to move the reference member 624 depending on the polarity of the permanent magnet 630 and the field of the electro-magnet 622.

In order to minimise the attractive force between the permanent magnet 630 and the soft iron core 637 when the electro-magnet is in active and the reference member is at its forward most position, a small permanent magnet 638 is fixed to the free end of the soft iron core. The orientation of the poles of the small permanent magnet 638 is opposite that of the permanent magnet 630 of the reference member and the induced field it produces in the soft iron core 637 cancels out the magnetic attraction between the core and the permanent magnet.

The embodiment of FIGS. 10 and 11 also shows a variation in the configuration of the recess 618 which is greater in dimension than the post 620 of the reference member. The post is slidably received in a cylindrical cage like support 639. This feature facilitates a more efficient fluid transfer between the chamber 612 and the portion of the recess 618 behind the permanent magnet 630.

To facilitate rapid movement of the reference member of each of the above embodiments, it is desirable to perforate the reference member with a series of holes. The holes facilitate a rapid flow of liquid between the faces on movement of the reference member. It is important however that the numbers and sizes of the holes do not detract significantly from the degree of cohesion or surface tension required between the faces of the reference member and the viewing face or rear face of the chamber.

In addition, the viewing face may comprise a lens or a multiple of small lens or like modification to improve the prominence of the display and/or to improve the visibility of the display from an angle.

Furthermore the display face of the reference member may be patterned or coloured as required and/or may have fluorescent properties.

In addition, the display member may take any desired shape or configuration to be abuttingly received with similar display members and may form part of a planar surface or a curved surface.

The claims defining the invention are as follows:

1. A display member comprising a housing having a chamber filled with a fluid and having a viewing face, a reference member, means for mounting said reference member within said chamber for movement between a first position in which a front face of the reference member is in face to face contact with said viewing face and a second position in which said front face of the reference member is out of contact with the viewing face, said means for mounting further providing for effecting retention of said reference member in either of said positions in the absence of the exertion of an external force, and drive means comprising a first magnetic device fixed relative to said housing and a second magnetic device fixed relative to said reference member, at least one of said magnetic devices being capable of being actuated to produce a driving force between the said devices to selectively move said reference member between said first and said second positions, the respective densities of said fluid and said reference member cooperating to limit the retention provided by said means for mounting.

2. A display member as claimed in claim 1 wherein the reference member has a rear face formed with a post which supports said second magnetic device and the means for mounting said reference member includes said post being slidably receivable in a portion of the housing accommodating the first magnetic device.

3. A display member as claimed at claim 1 wherein one of the magnetic devices comprises an electro-magnet.

4. A display member as claimed in claim 1 wherein one of the magnetic devices comprises a permanent magnet.

5. A display member as claimed at claim 2 wherein the first magnetic device is mounted on the housing portion and surrounds said post.

6. A display member as claimed at claim 3 wherein the first magnetic device is located with one pole adjacent one end of said post.

7. A display member as claimed at claim 3 wherein the first magnetic device is fixed to a mounting plate to which the housing is fixed.

8. A display member as claimed at claim 3 wherein said first magnetic device comprises an electro-magnet with a soft iron core.

9. A display member as claimed at claim 8 wherein said first magnetic device also includes a permanent magnet adjacent the outermost pole of the first magnetic device and having its poles positioned in opposed relation to the poles of the second magnetic device to provide sufficient repulsion between the soft iron core and second magnetic device to overcome the inherent ferromagnetic attraction therebetween.

10. A display member as claimed at claim 5 wherein the first magnetic device comprises a pair of electro-magnets spaced axially with respect to said post sufficiently so that when said reference member is in either of its positions at least one of the poles of the second magnetic device is partially surrounded by one of the electro-magnets of the first magnetic device.

11. A display member as claimed at claim 2 wherein the post is axially slidable in said housing portion and is fixed against relative rotation therein.

12. A display member as claimed at claim 1 wherein the reference member has zero buoyancy within said fluid.

13. A display member as claimed at claim 1 wherein the reference member is formed with an internal cavity closed by a flexible diaphragm to accommodate pressure variations within the chamber.

14. A display member as claimed at claim 1 wherein the chamber comprises a pair of opposed sub-chambers each with a viewing face and rear face and a reference member in each sub-chamber.

15. A display member as claimed at claim 14 wherein said reference members are interconnected.

16. A display member as claimed at claim 14 wherein said reference members are movable independently.

17. A display member as claimed at claim 1 wherein said chamber supports a plurality of reference members located in side by side relationship.

18. A display member as claimed at claim 17 wherein said reference members are movable independently of each other.

19. A display member as claimed at claim 17 wherein the chamber comprises a plurality of sub-chambers located side by side and each supporting a reference member.

20. A display member as claimed at claim 19 wherein said sub-chambers are interconnected.

21. A display member as claimed at claim 1 wherein a soft iron element is located in the region of said rear face of the housing to lie adjacent one pole of the second magnetic device when the reference member is in one of its positions.

22. A display member as claimed at claim 1 wherein a soft iron element is located adjacent each of said first and second positions of said reference member to be adjacent one pole of the second magnetic device when at one of its positions.

23. A display member as claimed at claim 1 wherein a magnetic element is located adjacent each of said first and second positions of said reference member to lie adjacent respective poles of the second magnetic device when at its first and second positions and to provide a retention force therebetween 24. A display member comprising a housing having a chamber filled with a fluid and having a viewing face, a recess formed by said housing on the side opposite said viewing face, a reference member having a post, said post being supported within said recess for mounting said reference member within said chamber for movement between a first position in which a front face of the reference member is in face to face contact with said viewing face and a second position in which said front face of the reference member is out of contact with the viewing face, the cooperation of said post with said recess further providing for precluding movement of said reference member from either of said positions to the other of said positions in the absence of the exertion of an external force, drive means comprising a first magnetic device fixed relative to said housing and a second magnetic device fixed relative to said reference member, at least one of said magnetic devices being capable of being activated to produce an external force between the said devices to selectively move said reference member between said first and second positions.

25. A display member as claimed at claim 24 wherein one of the magnetic devices comprises an electro-magnet.

26. A display member as claimed at claim 24 wherein one of the magnetic devices comprises a permanent magnet.

27. A display member as claimed at claim 24 wherein the first magnetic device is mounted around the housing recess and surrounds said post.

28. A display member as claimed at claim 25 wherein said first magnetic device comprises an electro-magnet with a soft iron core.

29. A display member as claimed at claim 28 wherein said first magnetic device also includes a permanent magnet adjacent the outermost pole of the first magnetic device and having its poles positioned in opposed relation to the poles of the second magnetic device to provide sufficient repulsion between the soft iron core and second magnetic device to overcome the inherent ferromagnetic attraction therebetween.

30. A display member as claimed at claim 27 wherein the first magnetic device comprises a pair of electro-magnets spaced axially with respect to said post sufficiently so that when said reference member is in either of its positions at least one of the poles of the second magnetic device is partially surrounded by one of the electro-magnets of the first magnetic device.

31. A display member as claimed at claim 24 wherein the post is axially slidable in said recess and is fixed against relative rotation therein.

32. A display member as claimed at claim 24 wherein the reference member has zero buoyancy within said fluid.

33. A display member as claimed at claim 24 wherein the reference member is formed with an internal cavity closed by a flexible diaphragm to accommodate pressure variations within the chamber.

34. A display member as claimed at claim 24 wherein the chamber comprises a pair of opposed sub-chambers each with a viewing face and rear face and a reference member in each sub-chamber.

35. A display member as claimed at claim 24 wherein a soft iron element is located in the region of said rear face of the housing to lie adjacent one pole of the second magnetic device when the reference member is in one of its positions.

36. A display member as claimed at claim 24 wherein a soft iron element is located adjacent each of said first and second positions of said reference member to be adjacent one pole of the second magnetic device when at one of its positions.

37. A display member as claimed at claim 24 wherein a magnetic element is located adjacent each of said first and second positions of said reference member to lie adjacent respective poles of the second magnetic device when at its first and second positions and to provide a retention force therebetween.

38. A display member comprising a housing having a chamber filled with a fluid and having a viewing face, a reference member, means for mounting said reference member within said chamber for movement between a first position in which a front face of the reference member is in face to face contact with said viewing face and a second position in which said front face of the reference member is out of contact with the viewing face, said means for mounting said reference member for movement within said chamber further providing for precluding movement of said reference member from either of said positions of the other of said positions in the absence of the exertion of an external force and for precluding rotation of said reference member within said housing, drive means comprising a first magnetic device fixed relative to said housing and a second magnetic device fixed relative to said reference member, at least one of said magnetic devices being capable of being activated to produce an external force between the said devices to selectively move said reference member between said first and said second positions.

39. A display member as claimed at claim 38 wherein the reference member has a rear face formed with a post which supports said second magnetic device and the means for mounting the reference member includes said post being slidably receivable in a portion of the housing accommodating the first magnetic device.

40. A display member as claimed at claim 39 wherein the reference member is formed with an internal cavity closed by a flexile diaphragm to accommodate pressure variations within the chamber.

41. A display member comprising a housing having a chamber filled with a fluid and having a viewing face, a reference member, means for mounting said reference member within said chamber for movement between a first position in which a front face of the reference member is in face to face contact with said viewing face and a second position in which said front face of the reference member is out of contact with the viewing face, said means for mounting said reference member for movement within said chamber further providing for precluding movement of said reference member from either of said positions to the other of said position in the absence of the exertion of an external force, drive means comprising a first magnetic device fixed relative to said housing and a second magnetic device fixed relative to said reference member, at least one of said magnetic devices being capable of being activated to produce an external force between the said devices to selectively move said reference member between said first and said second positions, and means for compensating for temperature induced variations in the volume of said fluid.

42. A display member as claimed at claim 41 wherein the reference member is formed with an internal cavity closed by a flexible diaphragm to form the means for compensating for temperature variations.

* * * * *